Sept. 4, 1934.   W. ANDERSON   1,972,415
CAMP TRAILER
Filed Sept. 10, 1932   3 Sheets-Sheet 1
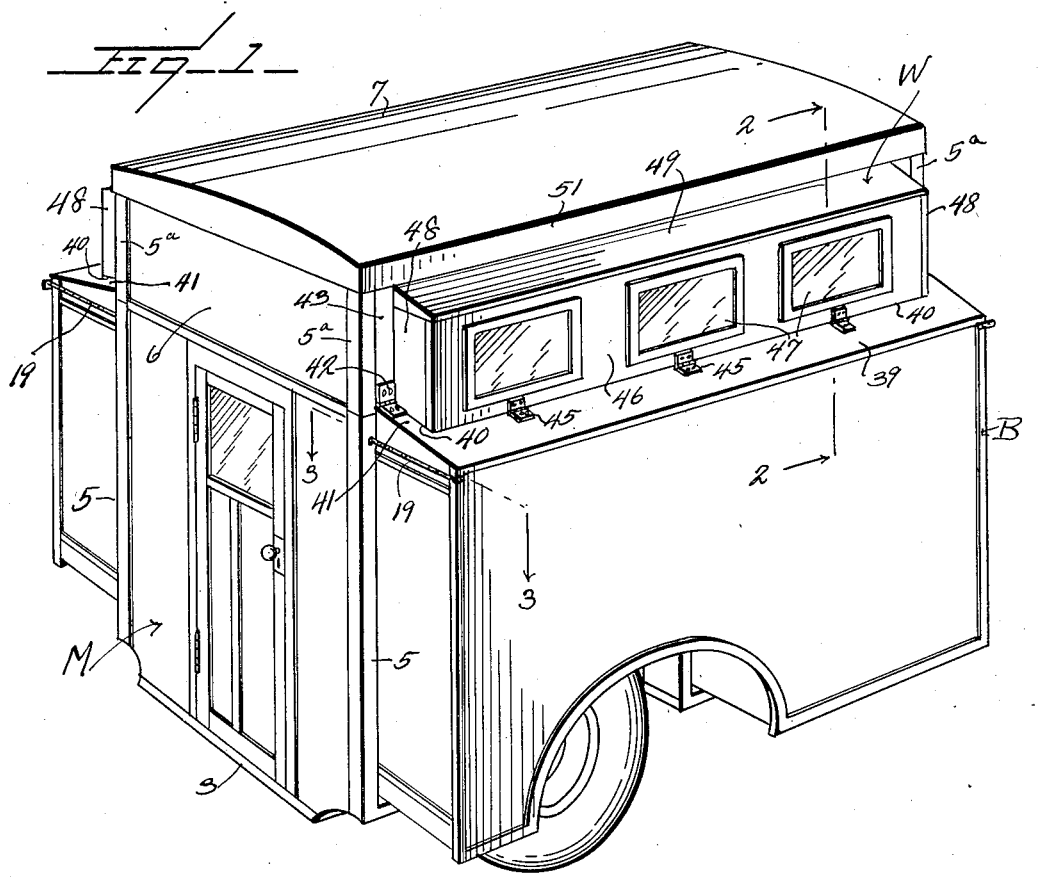
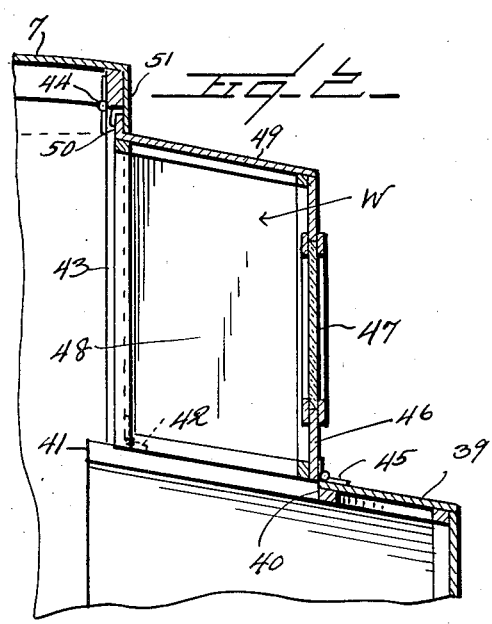
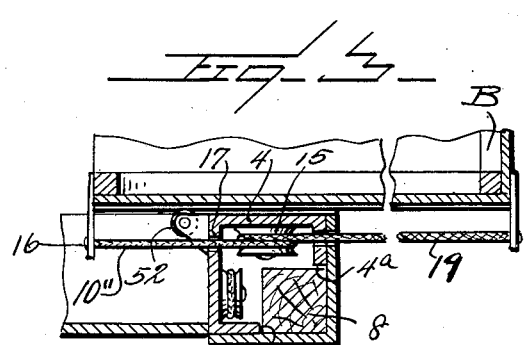
Inventor
W. Anderson
By Watson E. Coleman
Attorney

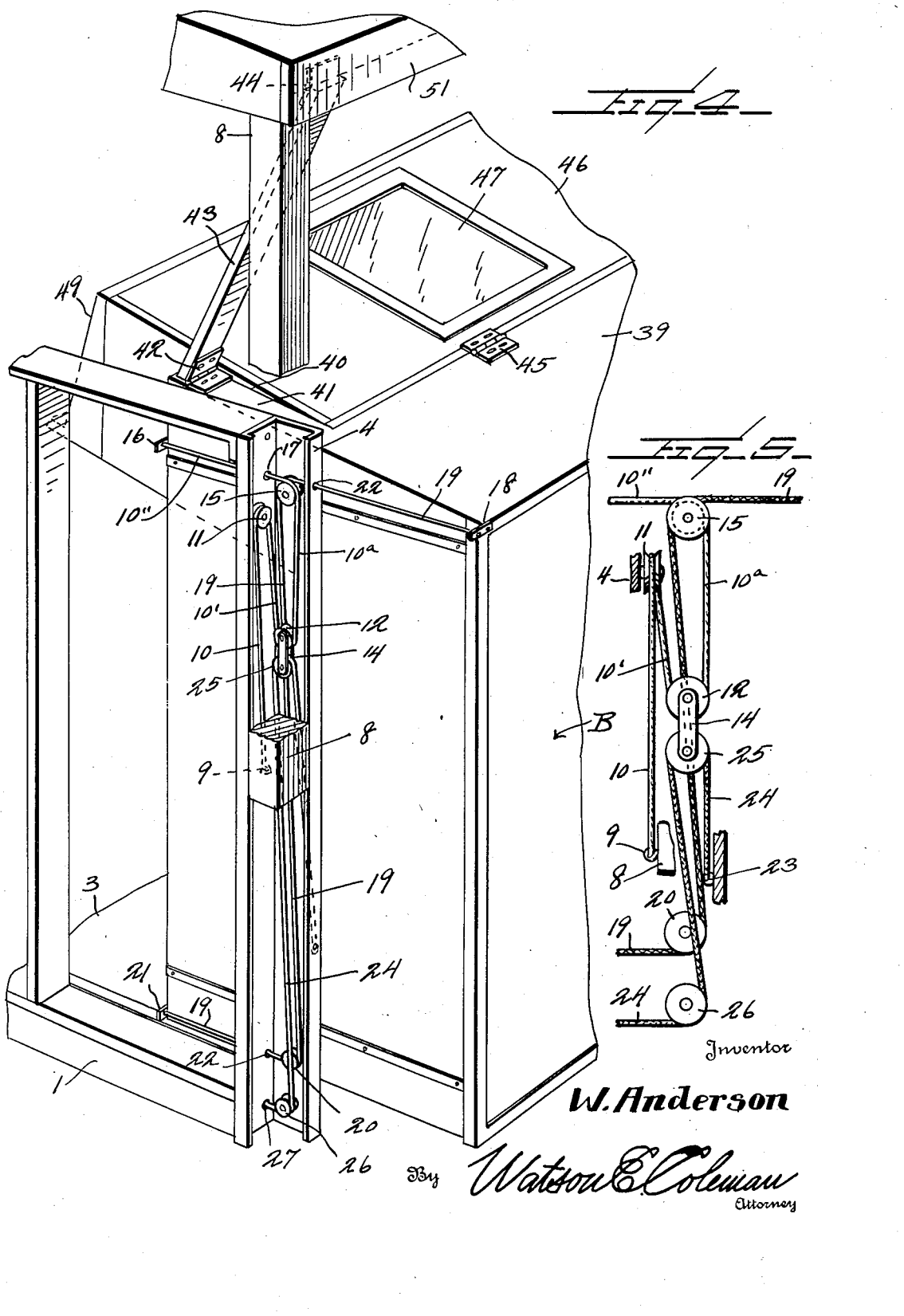

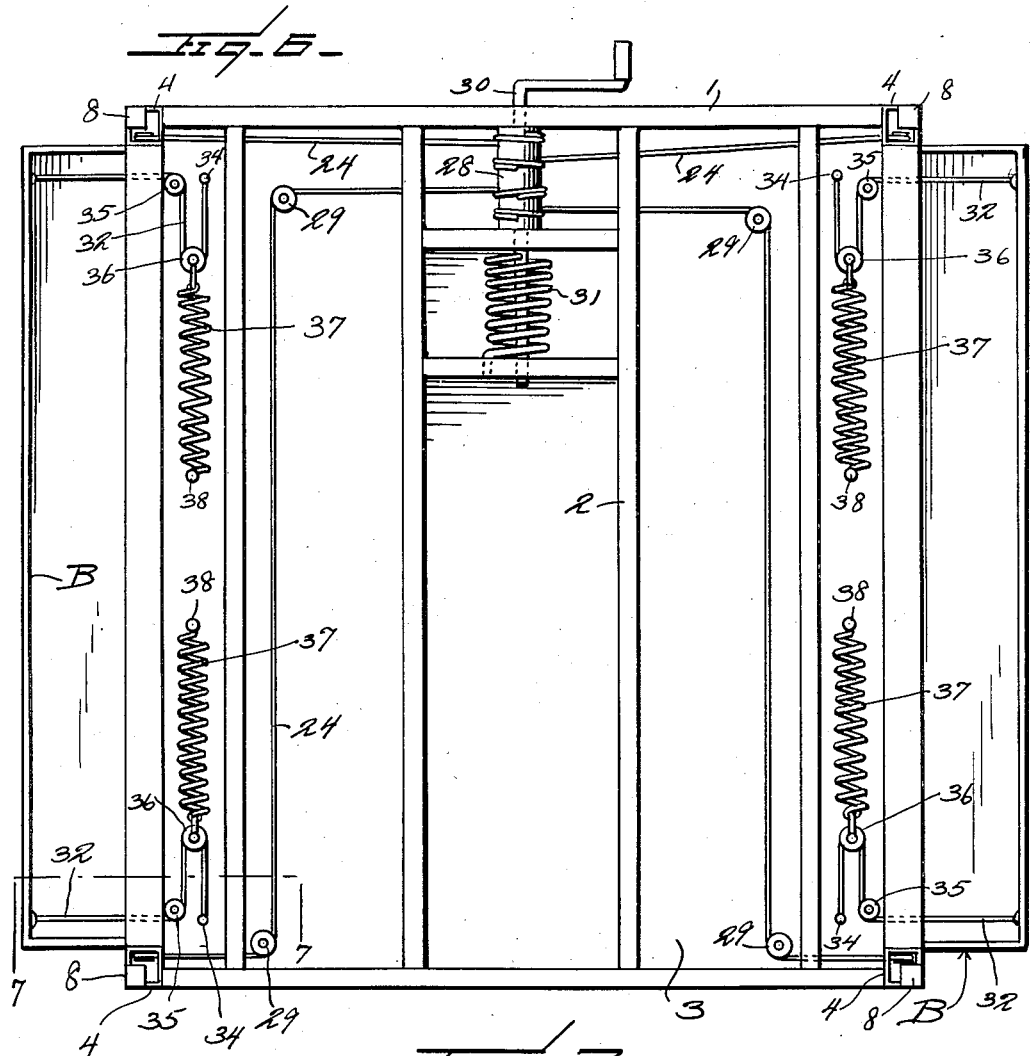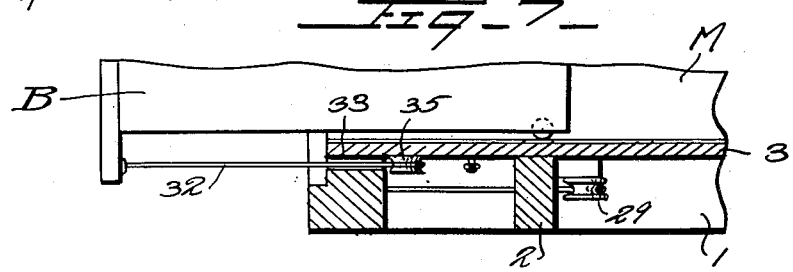

Patented Sept. 4, 1934

1,972,415

UNITED STATES PATENT OFFICE 1,972,415

CAMP TRAILER

William Anderson, Detroit, Mich.

Application September 10, 1932, Serial No. 632,581

3 Claims. (Cl. 296—26)

This invention relates to a camp trailer, and it is an object of the invention to provide a device of this kind of a contracting and expanding type and wherein the desired adjusting of the device is under convenient control of a rotating member.

It is also an object of the invention to provide a trailer of this kind which can be compacted or collapsed in order to facilitate its transportation yet which, when desired for use, can be extended or contracted with ease.

Furthermore, it is an object of the invention to provide a trailer comprising a wheel supported main or central body together with side bodies in telescoping relation with respect to the main or central body with means coacting with each of the side bodies for maintaining the same in an effective upright position at all times.

The invention also has for an object to provide a device of this kind comprising a central or main body together with extensible and retractile side bodies associated therewith and also a top member supported for up and down adjustment together with means for simultaneously raising the top member as the side bodies are moved outwardly and vice versa.

The invention consists in the details of construction and in the combination and arrangement of the several parts of my improved camp trailer whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in perspective of a trailer constructed in accordance with an embodiment of my invention and in extended adjustment for use;

Figure 2 is an enlarged fragmentary sectional view taken substantially on the line 2—2 of Figure 1 looking in the direction of the arrow;

Figure 3 is an enlarged fragmentary detailed sectional view taken substantially on the line 3—3 of Figure 1;

Figure 4 is a fragmentary view in perspective of a corner portion of the trailer as herein disclosed with certain of the parts removed and with the structure partly in folded and compacted adjustment;

Figure 5 is a fragmentary view partly in elevation and partly in section and of somewhat a diagrammatic character illustrating the mounting and arrangement of certain of the cables associated with a side member for effecting and controlling the extending or retracting of said side member;

Figure 6 is a view in bottom plan of the trailer bodies as herein disclosed and of somewhat a diagrammatic character illustrating the means for effecting the desired extension or retraction of the side bodies;

Figure 7 is a fragmentary sectional view taken substantially on the line 7—7 of Figure 6.

As disclosed in the accompanying drawings, M denotes a main or central wheel supported body of desired dimensions including the end cross sills 1 and the longitudinal sills 2 together with a floor 3 supported thereon. This central or main body M in its structure comprises corner posts 4. Each of these corner posts 4 is tubular and rectangular in cross section with its outer corner portion broken away, said corner portion however in the complete assembly being closed by an angle iron 5, the upper portions 5a of which being separable for a purpose to be hereinafter referred to. These separable portions 5a are removable but serve when applied to hold in position a top cross panel 6 embodied in an end wall structure. This panel 6 is adapted to be removed when the device is to be compacted or collapsed so that no hinderance or obstruction will be offered thereby to the top member 7 in its downward movement.

The top member 7 is of required dimensions and at each of its corners is provided with an elongated depending member 8 which is slidably received within a corner post 4 at the cut-out corner portion thereof so that the free edges 4a of the post 4 serve as the guiding medium for the member 8. The applied angle iron 5 serves to assure the member 8 being maintained in desired assembly with respect to a corner post 4 and it is also to be stated that when the top member 7 is to be lowered the upper cut away portion 5a of each of the angle irons 5 as well as each of the end panels 6 are removed. Each of these panels 6 as well as each portion 5a of an angle iron 5 are returned to desired working position when the top member 7 is raised in its fully working position as is clearly illustrated in Figure 1 of the accompanying drawings.

Each of the members 8 has anchored, as at 9, to the lower portion thereof a flexible member or cable 10 which extends upwardly and over a pulley 11 rotatably mounted upon the upper portion of a side wall of the corner post 4. The cable 10 is then continued downwardly, as at 10', and under the upper pulley 12 of a tackle 14. The member or cable is then extended upwardly, as at 10a, over the pulley 15 rotatably supported by a second wall of the corner post 4 and then inwardly of the main body M, as at 10'', for attachment, as at 16, to the upper rear portion of a side body B. The portion 10' as herein disclosed is freely directed through a suitably positioned opening 17 in the first named wall of the corner post 4.

Secured, as at 18, to an upper outer corner of the side body B is a second flexible member or cable 19 which extends over the pulley 15 hereinbefore referred to and then downwardly from the pulley 15 and under a pulley 20 rotatably supported by a wall of the corner post 4 adjacent to the lower part thereof and from this pulley 20 the cable 19 extends inwardly of the side body B and is anchored or secured, as at 21, to a lower rear corner portion of the body B. The walls of the post 4 are provided with the openings 22 to allow for the passage therethrough of the cable 19.

As each of the members 8 moves downwardly or upwardly with respect to its post 4 the arrangement and mounting of the cables 10 and 19 together with the various pulleys associated therewith will act as effective guides or supports for maintaining the associated side body B in an upright position at all times during its movement from its innermost position to its outermost position.

Also secured, as at 23, to the lower portion of each of the posts 4 is a cable 24 which extends up and over the lower pulley 25 of the tackle 14 and then down and under a second pulley 26 rotatably supported by the lower portion of a side wall of the corner post 4. The cable 24 then extends inwardly through a suitably positioned opening 27 in the corner post 4 to the central or main body M and below the floor 3 of said body M to the winding drum 28. Certain of these cables 24 are also engaged with suitably positioned guide pulleys 29. As particularly illustrated in Figure 6 the drum 28 is common to all of the cables 24 and rotates around an axis disposed lengthwise of the body M. This drum 28 is also provided with a winding shaft 30 arranged beyond an end of the body M so that said shaft 30 may be manually operated to rotate the drum 28 in the required direction to either raise or lower the top member 7.

As also particularly illustrated in Figure 6 the winding shaft 30 of the drum 28 has operatively engaged therewith a coil spring 31 which, as the shaft 30 is rotated in a direction to allow the top member 7 to raise, is placed under tension whereby the lowering of said top member 7 will be materially facilitated and in what may be termed an automatic manner. It is to be understood that the lowering of the top member 7 is further facilitated by gravity as afforded by the weight of the top member 7 and its associated parts.

It is also believed to be self-evident that as the drum 28 is rotated in one direction each of the side bodies B will be extended and during which operation the top member 7 will be raised and vice versa.

To further facilitate the desired retraction of the side bodies B each of said bodies adjacent its outer corners has connected thereto the flexible members or cables 32 each of which extends inwardly through a suitably positioned opening 33 in an adjacent side sill of the main body structure. The inner end portion of the flexible member or cable 32 is anchored, as at 34, to the floor 3 of the main body M. This cable or member 32 also coacts with a pulley 35 rotatably supported by the floor 3. Engaged with the cable or member 32 between the pulley 35 and the connection 34 is a block pulley 36 to which is secured a retractile spring 37 of desired tension, said spring being also anchored, as at 38, to the floor 3. These springs 37 with their coacting block pulleys 36 cooperate with the cables or flexible members 32 to facilitate in substantially an automatic manner the desired inward or compacting movement or adjustment of the side bodies B.

Each of the side bodies B has its inner portion open so that it constitutes a substantial continuity of the chamber of the main body B and more especially when in its extended or working position.

The inner marginal portion of the top wall 39 of each of the side bodies B is cut-out, as at 40, said cut-out portion extending substantially from one end of the top wall 39 to the other but terminating a sufficient distance inwardly of each end of the body B to provide an inner top ledge 41. The inner or free portion of each of such ledges 41 has hingedly connected thereto, as at 42, an end portion of a narrow panel or post 43 the opposite end portion of the post or panel 43 being hingedly connected, as at 44, to the adjacent portion of the top member 7. By this particular mounting of each of the panels or posts 43 as a body member B is moved outwardly the associated panels or posts 43 provide further means to assure the desired upward movement of the top member 7 and to assure said top member 7 being maintained in desired raised position when said panels or posts 43 each assume a vertical position. These panels or posts 43 may also be termed "equalizing posts" as they assure the desired raising of the top member 7 without binding or other hinderance or obstruction being offered by the members 8.

The inner margin of the cut-out portion 40 of the top wall 39 of each of the side bodies B has hingedly connected thereto, as at 45, the lower marginal portion of the outer side wall 46 of a window housing W. This wall 46 is provided at desired points thereon with the windows 47. This housing W is provided with the end walls 48 and a top wall 49 so when the housing W is in its raised and working position said housing together with the raised panels or posts 43 will effectively close the side portion of the trailer above the top wall 39 of the associated extended side body B as well as the cut-out portion 40 hereinbefore referred to.

The upward and outward swinging movement of a window housing W, as particularly illustrated in Figure 2, is limited by an upstanding flange 50 defining the top wall 49 of the housing W which contacts from within with a depending side apron or wall 51 of the top member 7. When it is desired to fold or compact the structure each of the housings W is swung inwardly and downwardly as illustrated more particularly in Figure 4 of the accompanying drawings whereupon after each of the top panels 6 has been removed together with the portions 5a of the angle irons 5 the top member 7 is free to move downwardly as the side bodies B travel inwardly.

Each of the corner posts 4 carries one or more anti-friction rollers 52 to facilitate the inward and outward movement of the adjacent side body B. It is to be stated that kindred anti-friction elements may be positioned to further facilitate the travel of said side bodies.

From the foregoing description it is thought to be obvious that a camp trailer constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A device of the class described comprising a main body, side bodies telescopically engaged therewith, each of said side bodies having a top wall, the inner marginal portion of which being cut out substantially from one end of said top wall to the other but terminating a sufficient distance inwardly of the ends to provide top ledges, a top member supported by the main body for up and down movement, posts hingedly connected to outer marginal portions of the top member and to the outer end portions of the top ledges of the side bodies to raise the top member when the side bodies are moved outwardly and to hold the top member raised while the side bodies are extended, a housing hingedly connected to the inner marginal portion of the cut out portion of the top wall of each of the side bodies and swinging into a position to close the space between the side body when extended and the top member when raised, said housing being of a length substantially equal to the length of the cut out portion.

2. A device of the class described comprising a main body, side bodies telescopically engaged therewith, each of said side bodies having a top wall, the inner marginal portion of which being cut out substantially from one end of said top wall to the other but terminating a sufficient distance inwardly of the ends to provide top ledges, a top member supported by the main body for up and down movement, posts hingedly connected to outer marginal portions of the top member and to the outer end portions of the top ledges of the side bodies to raise the top member when the side bodies are moved outwardly and to hold the top member raised while the side bodies are extended, a housing hingedly connected to the inner marginal portion of the cut out portion of the top wall of each of the side bodies and swinging into a position to close the space between the side body when extended and the top member when raised, said housing being of a length substantially equal to the length of the cut out portion, and a stop flange carried by the housing for contact with the top member when raised for limiting the movement of the housing when swung out into working position.

3. A device of the class described comprising a main body, side bodies telescopically engaged therewith, each of said side bodies having a top wall, the inner marginal portion of which being cut out substantially from one end of said top wall to the other but terminating a sufficient distance inwardly of the ends to provide top ledges, a top member supported by the main body for up and down movement, posts hingedly connected to outer marginal portions of the top member and to the outer end portions of the top ledges of the side bodies to raise the top member when the side bodies are moved outwardly and to hold the top member raised while the side bodies are extended, a housing hingedly connected to the inner marginal portion of the cut out portion of the top wall of each of the side bodies and swinging into a position to close the space between the side body when extended and the top member when raised, said housing being of a length substantially equal to the length of the cut out portion, and means coacting with the main body and the top member at both sides thereof and at the ends for raising the top member.

WILLIAM ANDERSON.